UNITED STATES PATENT OFFICE.

EDWARD F. ZINNS, OF MILWAUKEE, WISCONSIN.

COMPOSITION FOR FIRE-PROOF POTTERY.

SPECIFICATION forming part of Letters Patent No. 295,321, dated March 18, 1884.

Application filed September 25, 1883. (No specimens.)

*To all whom it may concern:*

Be it known that I, EDWARD F. ZINNS, of the city of Milwaukee, in the county of Milwaukee and State of Wisconsin, have invented certain new and useful Improvements in a Composition for Fire-Proof Pottery; and I do hereby declare that the following is a full, clear, and exact description of the invention, which will enable others skilled in the art to which it pertains to make and use the same.

My invention relates to pottery and other utensils used to withstand great heat—as, for instance, cooking-utensils, evaporating-pans, &c.

It consists in a novel compound of ingredients which bake into a firm and homogeneous composition capable of withstanding great heat without fracture or injury, and at the same time resisting acids and corrosion. It is particularly useful as a substitute for iron in the manufacture of pots, kettles, &c.

In making use of my invention I take of the following-named materials, which have been first finely pulverized, the following-mentioned proportions, by weight: graphite, forty-five parts; alumina, eighteen parts; silica, fifteen parts; magnesia, twelve parts; potter's clay, ten parts. In lieu of the first four (chemically pure) articles above enumerated, I prefer, on account of its cheapness, to use crude graphite, which I obtain in natural combination with the proper proportions of alumina, silica, and magnesia at Humboldt, Michigan, in which case the component materials are combined in the manner above described, in the following proportions, by weight: crude graphite, ninety parts; potter's clay, ten parts. These ingredients, after being thoroughly mixed while dry, are kneaded with water until the whole assumes a putty-like consistency, when it is molded into the form of the desired utensil, which is then covered with the ordinary mineral glaze or "slip" used by potters, and thoroughly baked at a white heat. The baking usually requires about forty-eight hours. When done, the articles can be used as ordinary metal pots and kettles are, and will be found to withstand a very hot fire without cracking or detriment. Being glazed and non-metallic in substance, they are more wholesome and non-corrosive than metal vessels.

Having thus described my invention, what I claim as new, and desire to secure by Letters Patent, is—

The composition for pottery, &c., consisting of alumina, silica, magnesia, potter's clay, and graphite, in about the proportions stated, when mixed and treated substantially as and for the purposes set forth.

In testimony that I claim the foregoing as my own I affix my signature in presence of two witnesses.

EDWARD F. ZINNS.

Witnesses:
E. H. BOTTUM,
CHAS. L. GOSS.